June 19, 1951 — E. F. MILLER — 2,557,883
JET PROPULSION EXHAUST NOZZLE APPARATUS
Filed Sept. 17, 1947
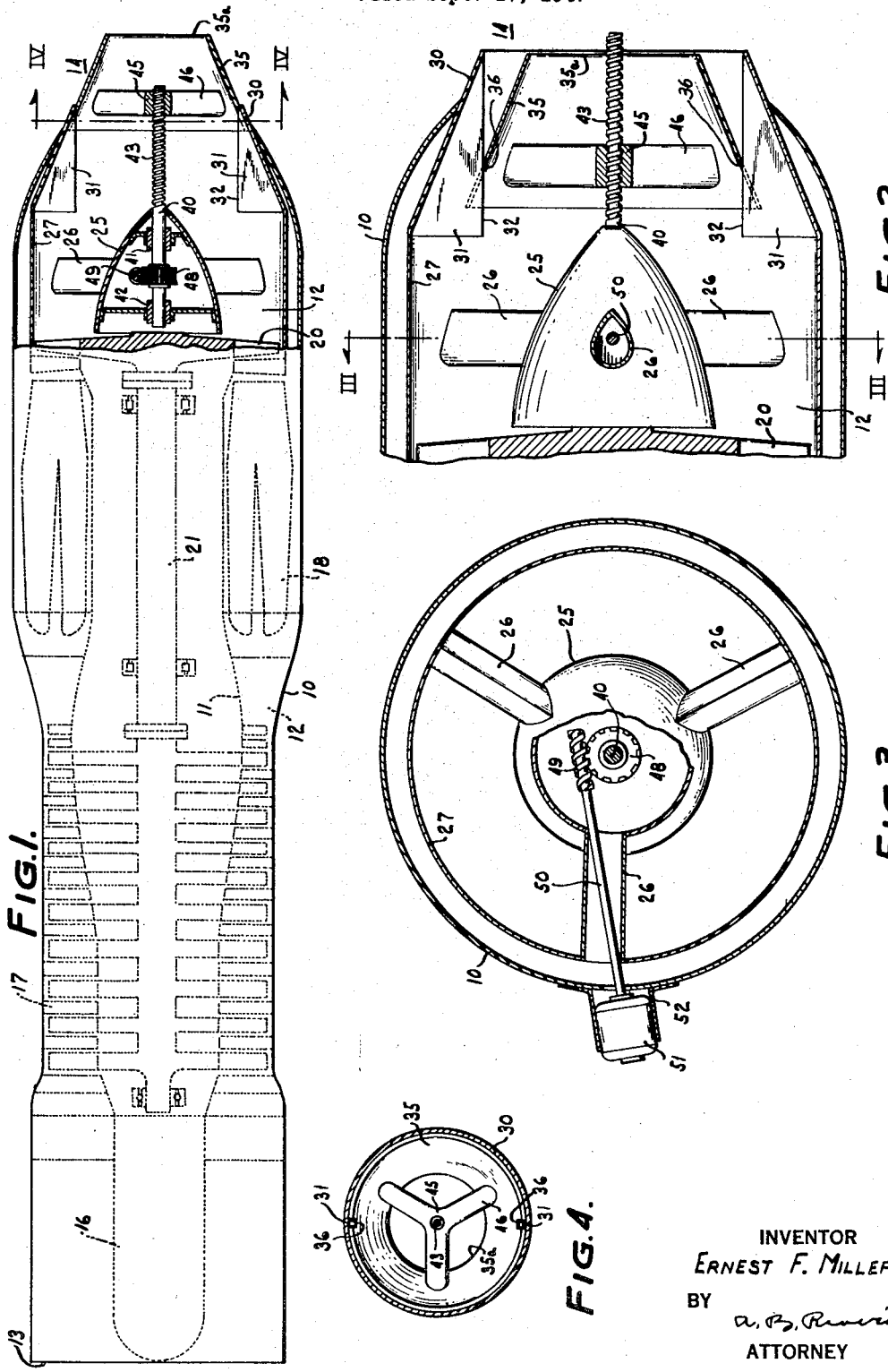
INVENTOR
ERNEST F. MILLER
BY
ATTORNEY

Patented June 19, 1951

2,557,883

UNITED STATES PATENT OFFICE 2,557,883

JET PROPULSION EXHAUST NOZZLE APPARATUS

Ernest F. Miller, Lansdowne, Pa., assignor, by mesne assignments, to the United States of America as represented by the Secretary of the Navy Application September 17, 1947, Serial No. 774,455

1 Claim. (Cl. 60—35.6)

This invention relates to gas turbine power plants and has for an object the provision of improved nozzle means for varying the back pressure and thrust characteristics of the exhaust gases of a gas turbine engine.

One well known form of gas turbine engine comprises a rotary compressor which is driven by a turbine to supply compressed air to a fuel combustion apparatus operative to generate motive fluid, which is expanded through the turbine and finally discharged by way of a nozzle for establishing a propulsion force. In order to facilitate control of such a power plant, it may be desirable to provide means for selectively varying the velocity and back pressure of turbine exhaust gases discharged through the nozzle. By varying the effective flow area of the nozzle of an aviation gas turbine engine, for example, the thrust of the engine can be reduced at will without effecting substantial change in rotational velocity of the compressor and turbine, so that the engine can be maintained readily responsive to a possible demand for rapid increase in thrust.

It is, therefore, another object of my invention to provide an improved turbo-jet nozzle structure for a power plant of the above type, including means for rendering the flow area of the nozzle variable at will.

A further object of the invention is the provision of an improved turbine exhaust nozzle including a stationary outer nozzle structure and a movable hollow inner cone or frusto-conical tube adapted for selective movement from a retracted position establishing a maximum flow area, to an outer position, for reducing the flow area of the nozzle to a minimum.

Another object of the invention is to provide an improved nozzle control structure having the aforesaid advantages, which can readily be adapted and installed in a gas turbine power plant of existing design.

These and other objects are effected by the invention as will be apparent from the following description and claim taken in connection with the accompanying drawing, forming a part of this application, in which:

Figure 1 is a schematic elevational view, partly in section, of a gas turbine power plant having a preferred form of my invention incorporated therein;

Figure 2 is a fragmentary sectional view, in enlarged detail, showing the exhaust nozzle structure of the apparatus illustrated in Figure 1, with the movable nozzle member in retracted position;

Figure 3 is a sectional view taken substantially along the line III—III of Figure 2; and Figure 4 is a sectional view taken substantially along the line IV—IV of Figure 1.

Illustrated in Figure 1 is a preferred form of gas turbine power plant with which the invention may be associated, comprising an outer streamlined, generally cylindrical casing structure 10 in which is mounted a tubular inner casing structure 11 forming an annular through-passageway 12, which extends from a forward air intake opening 13 to a rearward exhaust or jet nozzle indicated generally at 14. This power plant is adapted to be mounted in or on the fuselage or wings of an aircraft with the intake opening 13 pointed in the direction of flight. Mounted within the casing structure 10 along the longitudinal axis of the engine are a fairing section 16, which may house auxiliary control apparatus (not shown), a multiple stage axial-flow compressor 17, annular fuel combustion apparatus 18 including a suitable fuel manifold and nozzles (not shown), and a turbine 20, the rotor of which is operatively connected to the rotor of the compressor through the medium of a shaft 21 that is suitably journaled within casing structure 11.

The operation of a gas turbine power plant of the type illustrated is well known, and may briefly be explained as follows: air entering the intake opening 13 is compressed by the compressor 17 and delivered to the combustion apparatus 18, to support combustion of fuel supplied thereto through the usual manifold and nozzles (not shown). The fuel is thus burned to generate heated motive fluid which is then expanded through the turbine 20 and exhausted through the nozzle 14. In a gas turbine engine of the type illustrated, the nozzle 14 is adapted for discharge of motive fluid in the form of a jet establishing a propulsive force.

The inner casing structure 11 includes a terminal core or fairing section 25 which is adapted to be supported on radially disposed struts 26 within an inner tail-pipe section 27 carried concentrically within the outer casing structure 10. Formed on or suitably secured to the tail-pipe section 27 is a frusto-conical nozzle section 30, which extends through a rear opening in the outer casing structure 10 to form the nozzle 14. A plurality of guide plate elements 31, having guide surfaces 32 disposed parallel to the axis opening in the engine, are secured to the interior surface of the nozzle section 30.

For controlling the flow area of the nozzle 14 in cooperation with the nozzle section 30, there is provided a movable hollow frusto-conical nozzle member 35, the outer marginal surface of which is adapted to engage the terminal margin portion of the larger nozzle section 30, as shown in Figure 1. The movable nozzle member 35 has a relatively small outer opening 35a presenting a flow area considerably less than that of the outer opening of the nozzle section 30. As is best shown in Figure 4 of the drawing, radial slots 36 are formed in the nozzle member 35 adjacent the larger end thereof for slidably engaging the guide members 31 carried by the stationary nozzle section 30.

Referring to Figure 2, the main elements of the actuating mechanism for positioning the movable nozzle member 35 with relation to the stationary nozzle section 30 are mounted in a protected and relatively cool region within the fairing section 25. The mechanism illustrated comprises an axially-disposed rotary shaft 40 having an inner end journaled on bearings 41 and 42 mounted within the fairing section 25, and an outer screw-threaded portion 43 which is adapted to be operatively engaged in a suitably threaded bore formed in a hub portion 45 supported by means of a spider or radial arm member 46 within the movable nozzle member 35. Mounted on the inner end of the shaft 40 intermediate the bearings 41 and 42 is a pinion 48, which is operatively engaged by a worm gear 49 (see Fig. 3) carried on the inner end of an operating shaft 50, the outer end of which extends through one of the struts 26 to a driving connection with a suitable motor 51. The motor 51 may be mounted exteriorly of the outer casing structure 10 in any suitable manner, as by means of a supporting bracket 52. It will be noted that substantially all operating elements of the actuating mechanism are shielded from adverse effects of the heat of the turbine exhaust gases.

When it is desired to establish a maximum flow area for the discharge nozzle of the power plant, the motor 51 is energized to rotate the shaft 50, gears 49 and 48 and shaft 40 to effect inward movement of the movable nozzle member 35 toward the retracted position illustrated in Figure 2. With the movable nozzle member 35 in this position, the capacity of the nozzle 14 is substantially defined by the terminal opening of the stationary nozzle section 30, the exhaust gases being free to flow not only through the interior of the nozzle member 35 but also through the annular space defined between that member and the inner surface of the stationary nozzle section 30. If it is desired to reduce the flow capacity of the nozzle 14, however, the actuating motor 51 is operated in a reverse direction to effect outward movement of the movable nozzle member 35 toward the position in which this member is represented in Figure 1. If the movable nozzle member 35 is thus shifted outwardly until it engages the terminal portion of the stationary nozzle section 30, a minimum flow area of the nozzle 14 is established, since exhaust gases can then flow only through the opening 35a afforded by the smaller end of the frusto-conical member 35. It will be apparent that by proper selection of the position to which the movable nozzle member 35 is shifted, any selected flow area of the nozzle may be established, for effecting the desired control of operation of the gas turbine engine.

From the foregoing, it will now be seen that nozzle control apparatus constructed in accordance with the invention may be employed in a gas turbine power plant for improving the performance characteristics thereof, as well as to render available a measure of control highly desirable in aviation service operations. The operating elements of the nozzle control assembly are readily adaptable to existing engine designs, and will be particularly useful in connection with gas turbine equipment of the aviation type, where overall dimensions of the propulsion apparatus may be critical.

While the invention has been shown in but one form, it will be obvious to those skilled in the art that it is not so limited, but is susceptible of various changes and modifications without departing from the spirit thereof.

What is claimed is:

In a variable area nozzle assembly for a gas turbine power plant, a cylindrical outer casing structure having a converging interior wall forming a frusto-conical passage and a terminal nozzle opening, a turbine mounted in said casing structure upstream of said frusto-conical passage, a stationary fairing cone supported coaxially in said casing structure with its enlarged end disposed adjacent the exhaust side of said turbine, said fairing cone tapering throughout the axial extent thereof and defining within said casing structure an annular turbine exhaust passage which merges into said frusto-conical nozzle passage, a rotary screw-threaded shaft operatively mounted in said fairing cone and projecting axially from the tip thereof into said nozzle opening, an axially movable frusto-conical shell normally retracted into said frusto-conical passage and having a central spider structure mounted in screw-threaded engagement with said shaft, said shell having a converging passage extending from an upstream opening of slightly larger diameter than that of said nozzle opening to a discharge opening of substantially less flow area, the axial extent of said shell substantially corresponding with that of said frusto-conical passage in the casing structure, the annular upstream edge of said shell being carried in sealing engagement with the marginal portion of said interior wall of the casing structure bordering said nozzle opening upon movement of the shell to its rearmost extended position, and guide means carried by said outer casing structure in sliding engagement with said upstream edge of said shell for preventing relative rotation thereof during axial movement, said shell being shiftable by rotation of said shaft from the normal retracted position, in which the large end thereof is disposed in substantially coplanar alignment with the tip of said fairing cone for effecting flow of the total volume of turbine exhaust gases partly through said frusto-conical passage outwardly of said shell and partly through the discharge opening of said shell, to its extended position in which the total volume of turbine exhaust gases is constrained to flow through the combined extent of said passages in the casing structure and shell to the converging discharge opening of said shell, whereby said shell is operative simultaneously to extend the flow path and to reduce the flow area of exhaust gases discharged from said turbine for controlling said power plant.

ERNEST F. MILLER.

REFERENCES CITED

The following references are of record in the file of this patent:

UNITED STATES PATENTS

| Number | Name | Date |
| --- | --- | --- |
| 2,408,099 | Sherman | Sept. 24, 1946 |
| 2,439,817 | Mercier | Apr. 20, 1948 |
| 2,479,776 | Price | Aug. 23, 1949 |
| 2,479,777 | Price | Aug. 23, 1949 |
| 2,483,401 | Cole | Oct. 4, 1949 |

OTHER REFERENCES

Aviation, issue of November 1945, pages 120–123.